Sept. 15, 1936. R. LAPSLEY 2,054,222
COASTER DEVICE
Filed Jan. 31, 1931 7 Sheets-Sheet 1

Inventor
Robert Lapsley
By Brown Jackson Boucher &
Dienner Att'ys.

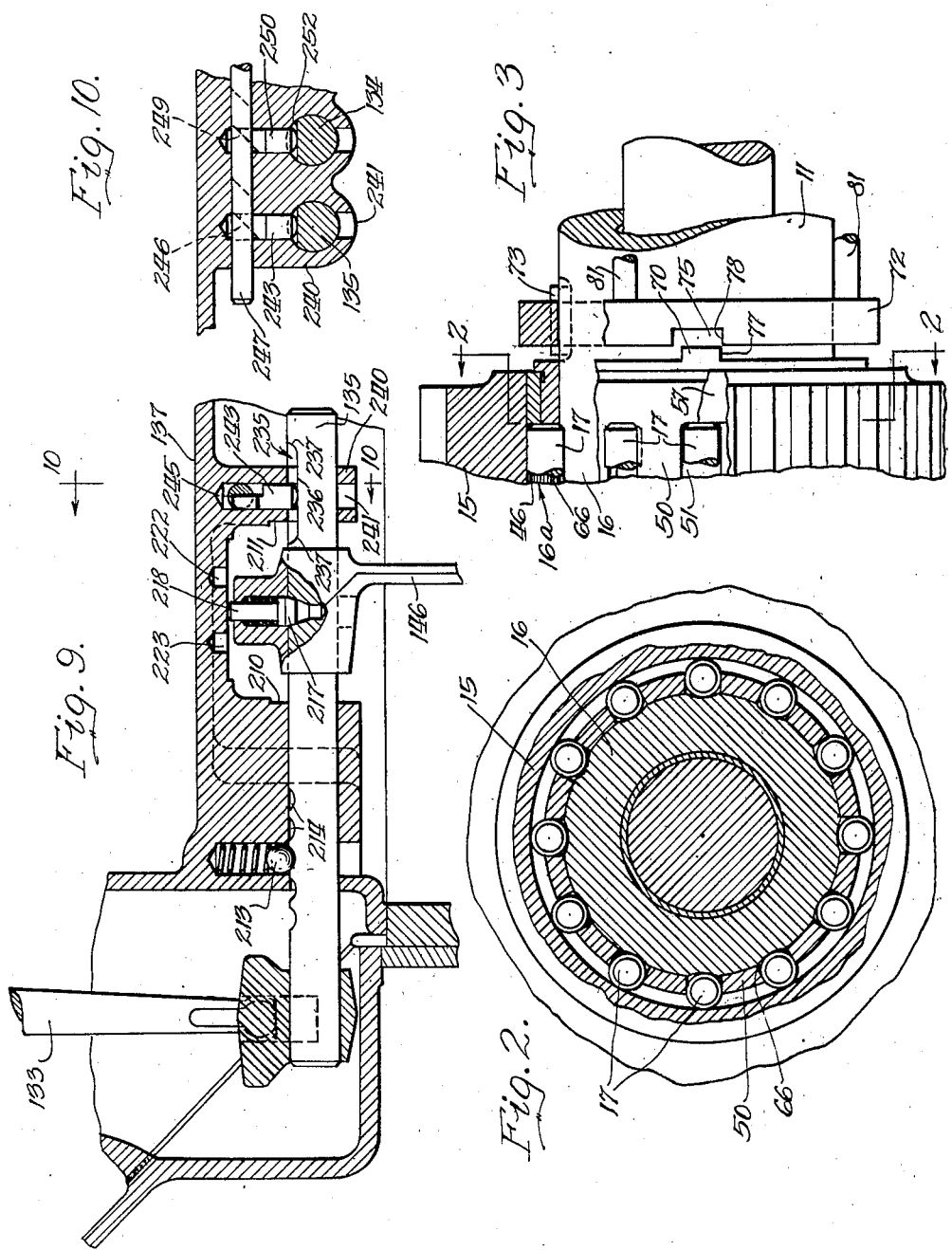

Sept. 15, 1936.  R. LAPSLEY  2,054,222
COASTER DEVICE
Filed Jan. 31, 1931  7 Sheets-Sheet 3

Inventor
Robert Lapsley

Sept. 15, 1936.    R. LAPSLEY    2,054,222
COASTER DEVICE
Filed Jan. 31, 1931    7 Sheets-Sheet 4
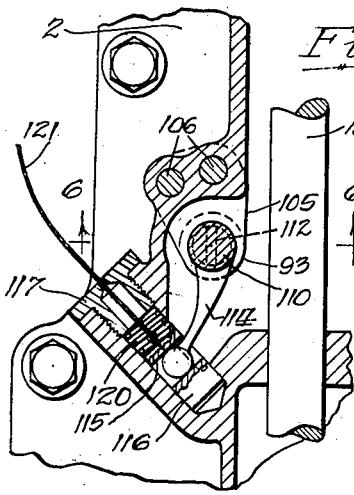
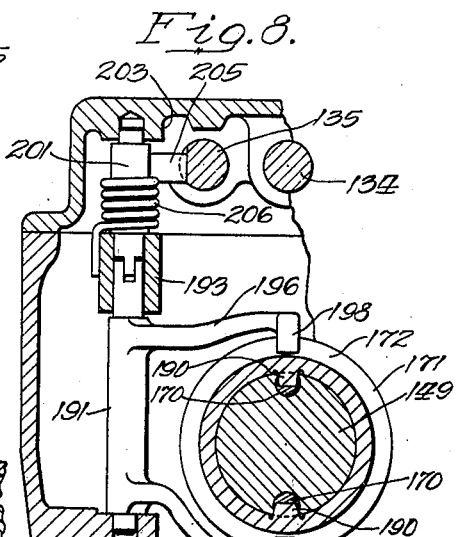
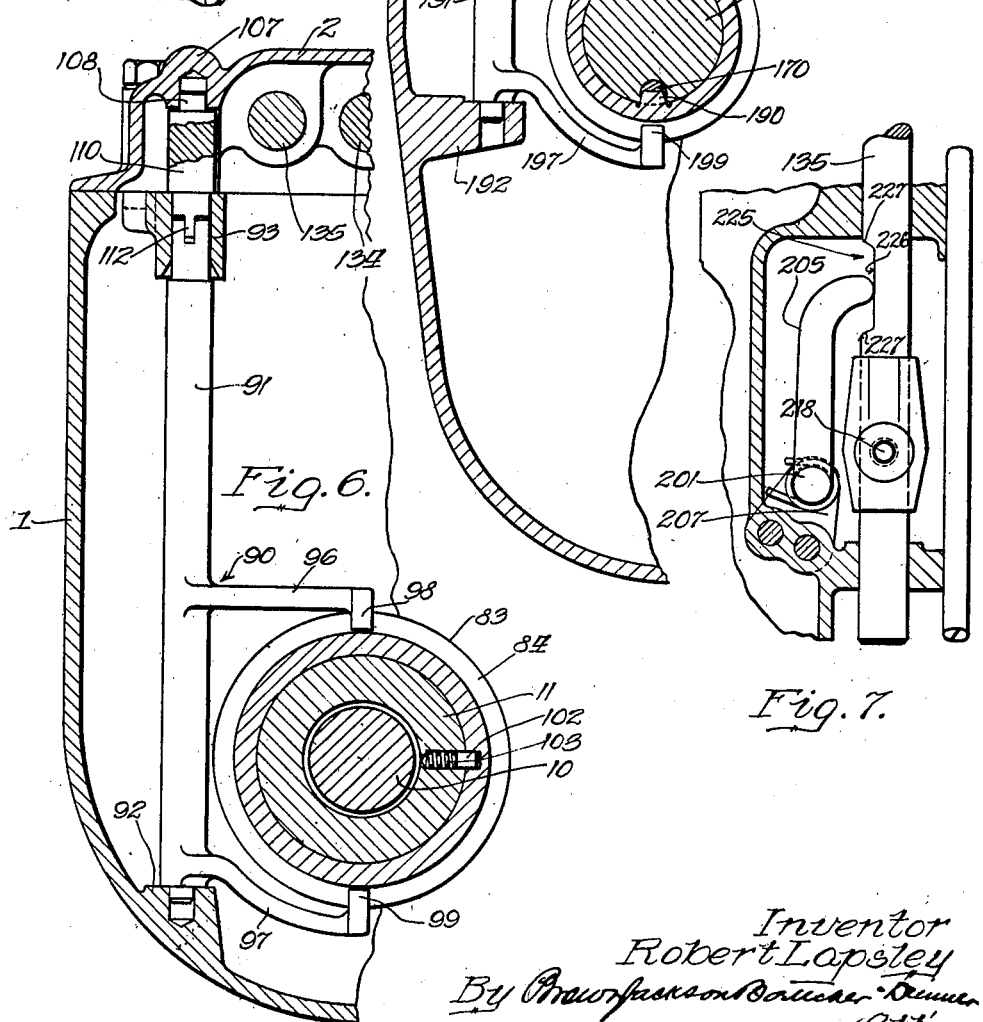

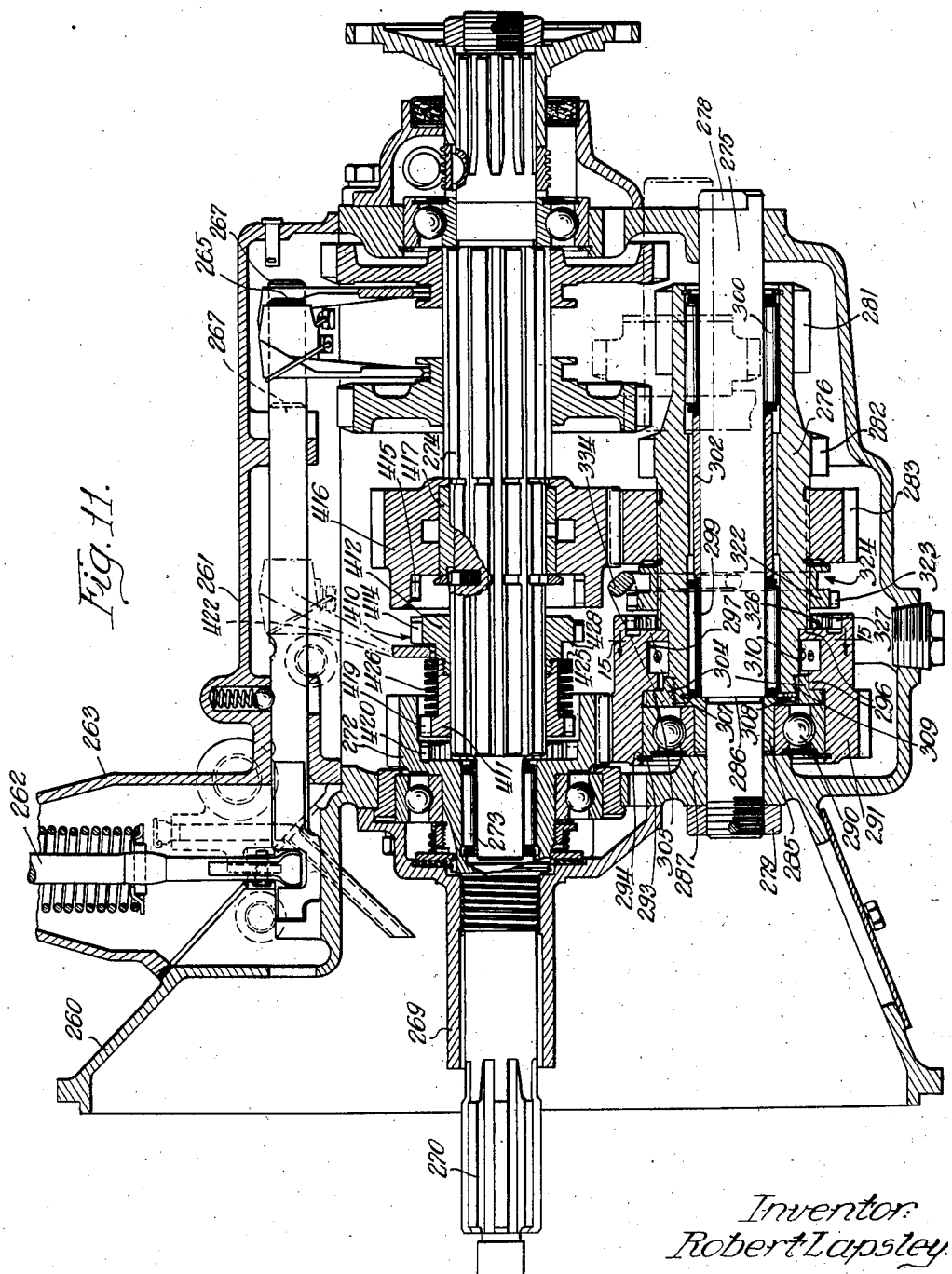

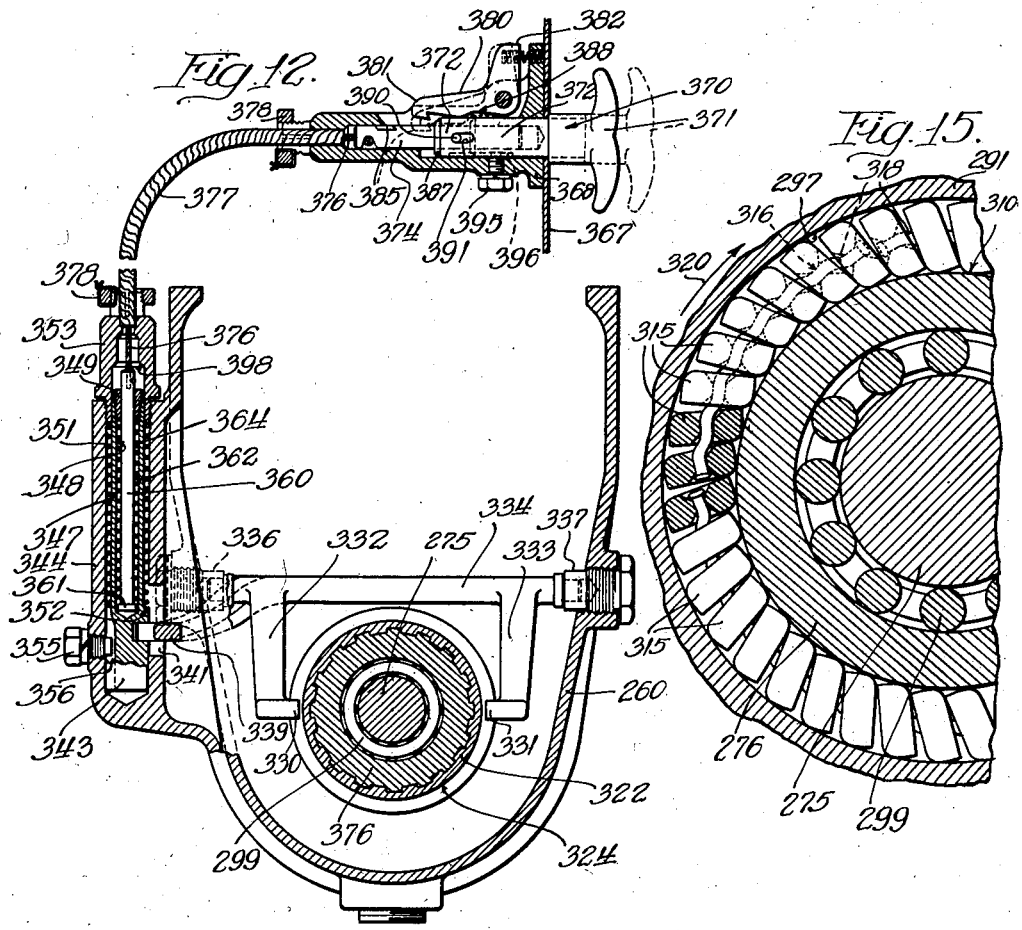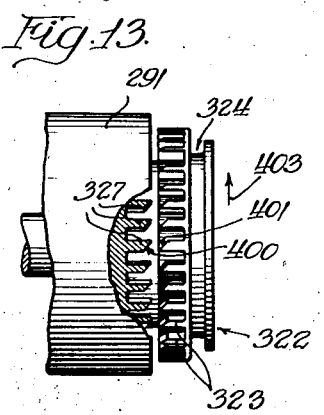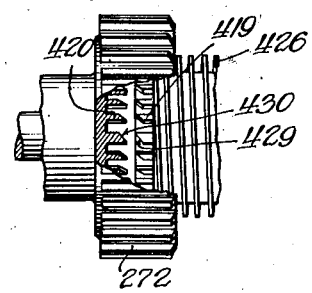

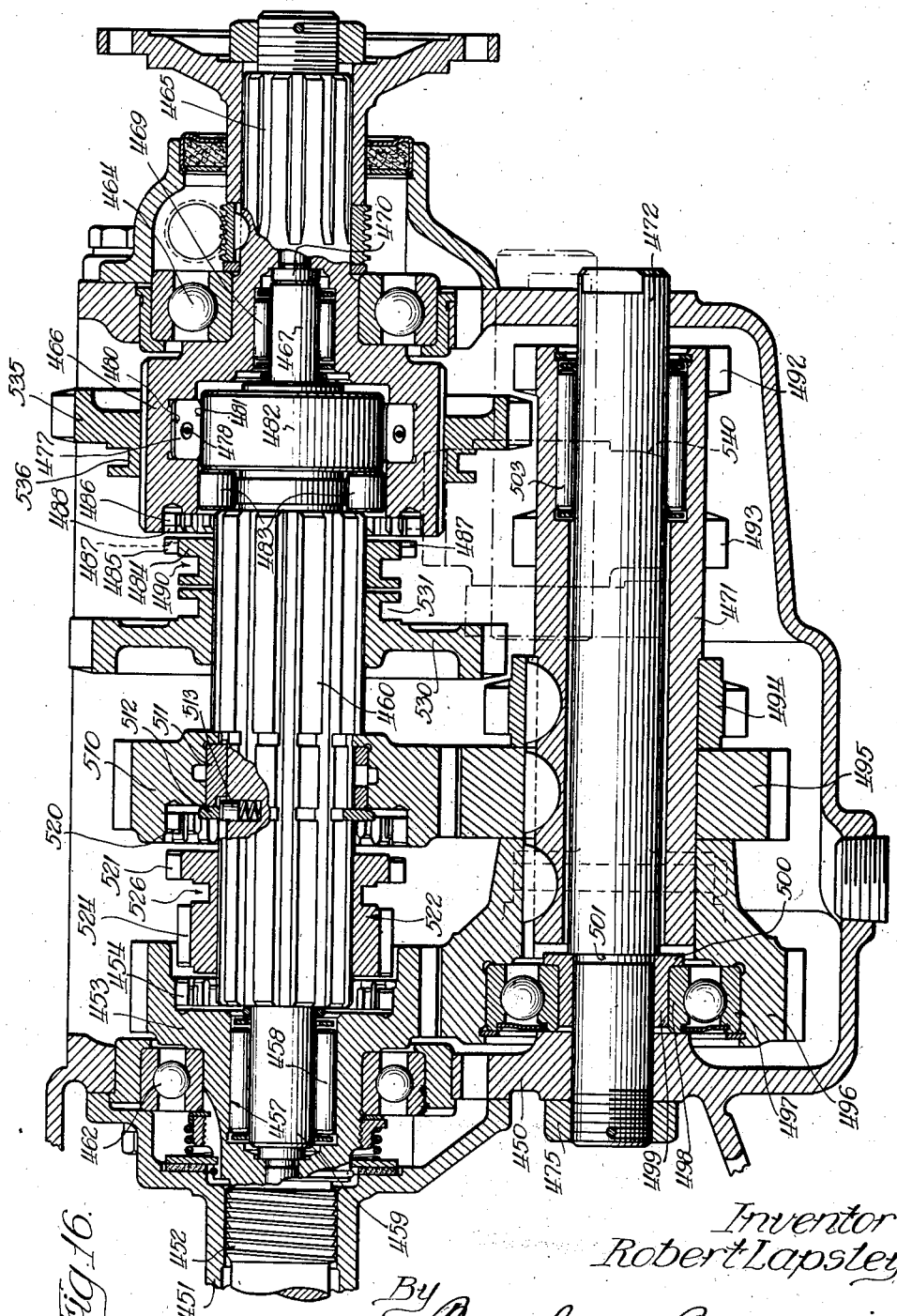

Patented Sept. 15, 1936

2,054,222

UNITED STATES PATENT OFFICE 2,054,222

COASTER DEVICE

Robert Lapsley, Berrien Springs, Mich., assignor to Clark Equipment Company, Buchanan, Mich., a corporation of Michigan Application January 31, 1931, Serial No. 512,595

9 Claims. (Cl. 74—333)

The present invention relates generally to power transmission devices and, more particularly, to a coaster device in the nature of an overrunning clutch which is optionally operable to transmit the drive in both directions or only in one direction, allowing overrunning to take place in the other direction.

The principal object, therefore, of the present invention is the provision of a new and improved overrunning clutch or coaster device and a new and improved control means therefor for rendering the overrunning feature of the clutch inoperative, that is, the control means is operative in one position to adjust the device for driving in one direction while the control is engaged, but in another position the coaster device is adjusted to transmit drive in both directions.

While my present invention is not to be limited to any particular form of power transmission device unless definitely recited in the appended claims, it is noteworthy that a coaster device constructed according to the present invention is particularly applicable to automobile transmissions, and it is in this connection that the same is described in detail by way of example to best illustrate the principles of the present invention.

When so embodied in an automobile transmission, one of the principal features is that the transmission may be operated either as an ordinary transmission in which the motor of the automobile is at all times connected to the driving wheels and may be used as a brake for retarding the speed of the automobile when in mountainous country or otherwise as desired, as well as a transmission which will coast in certain of the selected gear ratios. In one structural embodiment, coasting is permitted in all selected gear ratios except the direct drive, but including reverse, thereby providing gear shifting in all speeds without throwing out the usual clutch, except in low or first speed, and also providing coasting ability in all speeds, except direct drive. This particular arrangement is especially advantageous where my improved coaster device is embodied in a transmission having four forward speeds. In such an arrangement where the third forward speed is close to a 1 to 1 ratio, say 1¼ to 1, a transmission is provided which is characterized by additional power for quick acceleration in combination with a coaster for traffic driving in which the motor does not act to retard the car speed, and a direct drive for highway use in which the motor is available to act as a brake. Thus, in all of the other speeds, including reverse, arranged with the coaster in operation, there will be no drag upon the gears when shifting which can then be accomplished quite easily and quickly.

Other arrangements are possible, depending upon the particular location chosen for the overrunning clutch. I show, by way of example, a second arrangement wherein coasting is permitted only in direct and intermediate speeds.

Obviously, my improved coaster device may be embodied in other transmissions, for example, the customary three-speed forward transmission and other similar arrangements, and it is to be understood that such arrangements fall within the scope of the present invention.

An important feature of the present invention, as indicated above, relates to the means operable at will to control the operation of the coaster device to render the same operative or inoperative according to the desires of the operator or the requirements of the particular operating conditions. As embodied in automobile transmissions, this control means may be actuated either manually by the driver of the automobile or the control may be operatively associated with some one or more of the usual controls of the automobile, such as, for example, the gear shift lever and associated structure, the usual brake operating means, or other controls usually present, as may be desirable. While this particular feature is important because it looks toward an automatic and practically fool-proof arrangement which is substantially independent of the skill and experience of the individual driver, under some conditions it is equally important to provide a convenient manually operated means for locking out or rendering inoperative at will the overrunning clutch. By way of illustration, I have described in the specification and shown in the drawings two or three different constructions for manually controlling the operation of the overrunning clutch.

Other objects and advantages of the present invention will be apparent to those skilled in the art after a consideration of the following detailed description of the preferred construction, taken in conjunction with the accompanying drawings, in which:

Figure 2 is an enlarged fragmentary detail view showing in cross-section the driving and driven members of one form of my overrunning clutch device and the clutch elements or driving rolls between these members, and corresponding to a view taken substantially along the lines 2—2 of Figure 3;

Figure 3 is an enlarged fragmentary detail of the overrunning clutch device shown in Figure 2, certain parts being broken away to show the relation of the control device to the overrunning clutch;

Figure 5 is an enlarged detail view illustrating one form of manually operated means for controlling the overrunning clutch;

Figure 6 is a vertical cross-section taken substantially along the line 6—6 of Figure 5;

Figures 7 and 8 are, respectively, horizontal and vertical views showing a modified type of control, automatic in operation and more particularly adapted to the transmission and overrunning clutch device shown in Figure 4;

Figure 9 is another modified control device operated automatically by the gear shifting mechanism of the transmission for controlling the operation of the overrunning clutch;

Figure 10 is a cross-sectional view looking toward the left of Figure 9 and taken substantially along the line 10—10 of that figure;

Figure 11 is a vertical longitudinal cross-section illustrating the application of the present invention to a transmission similar to that shown in Figure 1, but differing slightly therefrom in certain details of the overrunning clutch and other parts, particularly the mounting of some of the gears and the shiftable control means associated therewith;

Figure 12 shows a slightly modified form of manual control for an overrunning clutch, particularly that shown in Figure 11. This manual control means can, however, be easily adapted to the particular forms of overrunning clutch structure shown in Figures 1 and 4;

Figures 13 and 14 are detail views, taken substantially along the lines 13—13 and 14—14, respectively, of Figure 11 and illustrating the ratchet connection between the overrunning clutch control means and the shiftable hub or dog movable into engagement with the driving shaft to effect a direct drive.

Figure 15 is a cross-section taken substantially along the line 15—15 of Figure 11; and Figure 16 is a fourth modification or structural embodiment of the present invention.

Figure 1:
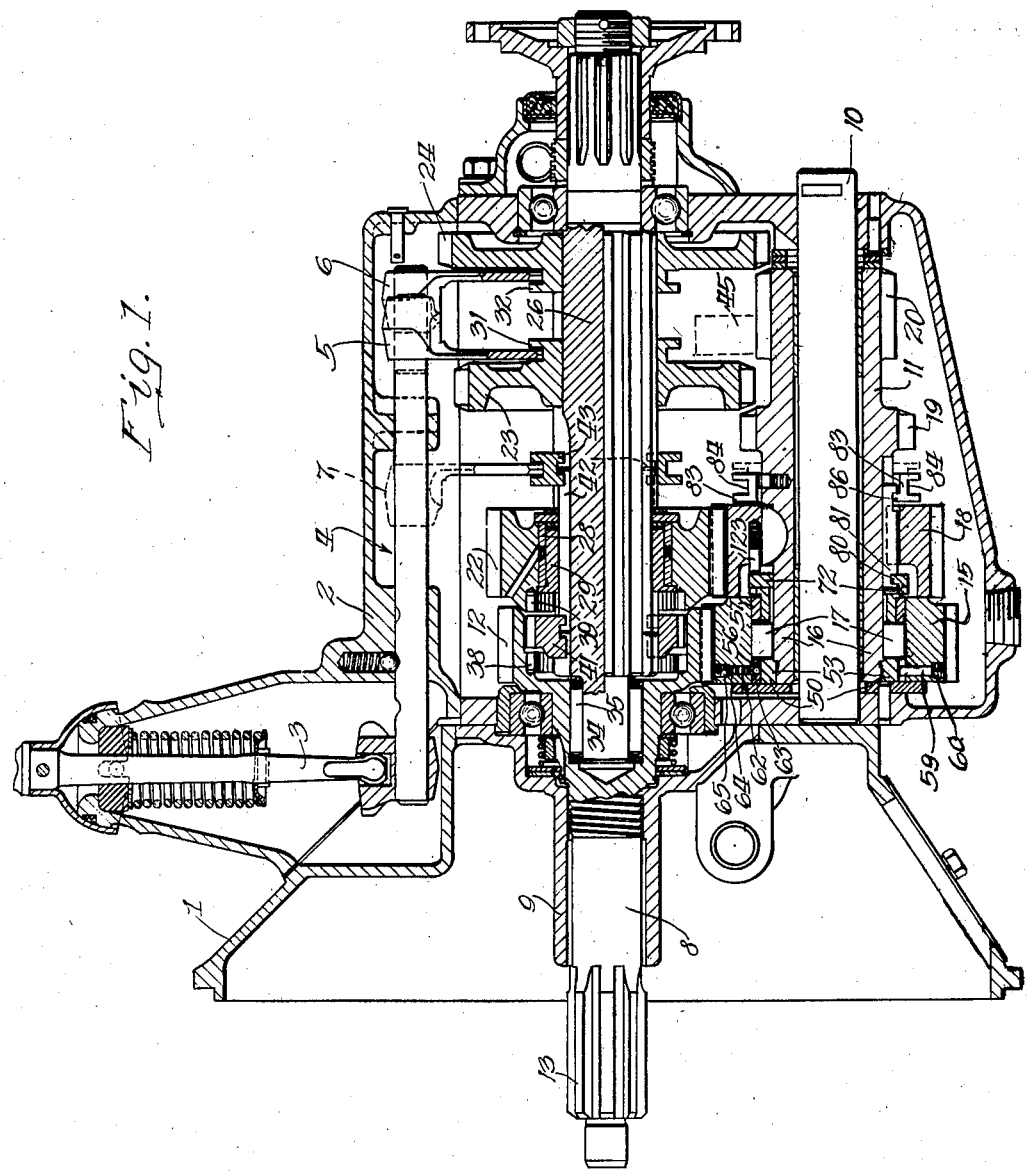
Figure 1 is a vertical longitudinal cross-section through an automobile transmission embodying the present invention, most of the parts being shown in section.

Referring now to the drawings, Figure 1 illustrates a type of transmission commonly known as a four-speed transmission including a housing 1, a cover plate 2 carrying the usual gear shift operating member or lever 3 and associated shift rods 4 carrying shifting forks 5, 6, and 7 in the usual and well known manner. In the forward part of the housing 1, the driving shaft 8 is journaled, the housing having one end provided with an elongated journal boss 9 for this purpose, and the lower portion of the housing 1 carries a fixed journal or spindle 10 upon which is rotatably mounted a secondary or intermediate driving shaft section 11, sometimes known as a countershaft.

The inner end of the driving shaft 8 is provided with a driving gear 12 which preferably is formed integrally with driving shaft 8, although, if desired, gear 12 may be separately formed and secured to the driving shaft 8 in any desired manner. The forward end of driving shaft 8 is splined, as at 13, for driving connection with the clutch of the automobile motor.

The driving gear 12 is adapted to mesh with the driving member 15 of my improved overrunning clutch device, later to be described in detail, and the driven member 16 of the overrunning clutch is preferably formed on the end of intermediate shaft section 11, although, if desired, member 16 may be separately formed and secured to shaft 11 in any manner desired.

The intermediate or secondary shaft 11 carries intermediate gears 18, 19 and 20 adapted to mesh, respectively, with gear members 22, 23 and 24 mounted on the driven shaft 26, which, as is usually found in automobile construction, is adapted to be directly connected to the propeller shaft which drives the driving wheels of the automobile. Gears 23 and 24 are splined directly to driven shaft 26, and gear 22 is journaled for free rotation on driven shaft 26, being journaled by bushing means 28 on a hub 29 keyed to driven shaft 26. Gears 23 and 24 are provided with the usual collars 31 and 32 which cooperate in the usual manner with shift forks 5 and 6, respectively.

As best shown in Figure 1, the inner reduced end 34 of the driven shaft 26 is journaled in the corresponding cylindrical opening in the rear end of the driving shaft 8 by bearing means 35 in the form of the usual roller bearing structure. The inner or rear end of the driving shaft 8 is also provided with teeth 38 formed on the interior of the driving gear 12. Directly opposite, axially of shafts 8 and 26 but spaced a distance from the teeth 38, is a second set of teeth 39 formed in the freely rotatable gear member 22. The splined portion of the driven shaft 26 extends forward to a point adjacent the inner reduced end 34, and a sliding dog or engaging member 41 is carried upon the inner splined end of shaft 26.

The sliding dog 41 is controlled by links or pins 42 carried by grooves in the driven shaft 26 and extending through openings in the hub 29. At one end the links 42 are notched for engagement with the dog 41 and at the other end the links are notched for engagement with the shift collar 43 splined onto shaft 26 and controlled by shift fork 7. By actuating the fork 7 to slide the member 41 forwardly to engage teeth 38 on driving gear 12, a direct drive is obtained, that is, the driven shaft section 26 is connected directly to the driving shaft section 8 so that no gear reduction is interposed between the automobile motor and the propeller shaft driving the drive wheels thereof.

When the sliding dog member 41 is slid rearwardly on the splines of shaft section 26 so that the teeth of the dog 41 engage teeth 39 on the gear member 22, the driven shaft 26 is connected through a gear reduction to the driving shaft 8, this gear reduction being obtained as follows:

The driving member 15 of the overrunning clutch device is constantly in mesh with the driving gear 12 fixed on driving shaft 8. Driving effort is transmitted from member 15 through the clutch driving elements to the driven member 16 of the overrunning clutch device which, in turn, drives the intermediate or secondary shaft 11. Gear 18, being keyed to shaft 11, is constantly in mesh with and drives the gear 22 journaled on the hub 29 keyed to driven shaft 26. Thus, under the conditions just mentioned, that is, when the dog member 41 operatively connects the gear 22 to the driven shaft 26, the latter receives the driving effort of the automobile motor through gears 12, 15, 18, and 22, respectively.

Other gear ratios are obtained by disengaging dog member 41 from both sets of teeth 38 and 39 and shifting gear 24 forwardly onto shaft 26 to engage gear 20 on the intermediate or secondary shaft 11, or by shifting gear 23 forwardly to engage gear 19 on the intermediate or secondary shaft, or rearwardly to engage the reverse gear 45 conventionally mounted within the transmission housing 1.

As best shown in Figs. 1 to 3, inclusive, my improved overrunning clutch includes the driving and driven members 15 and 16, as described above, and the driving clutch members 17 interposed therebetween. The driving clutch elements 17 are preferably formed in the nature of rolls spaced about the periphery of driven member 16 and within the inner cylindrical opening 16a formed in the driving clutch member 15. These driving rolls or rollers are spaced and held in proper position by means of a cylindrical cage structure 50 provided with slots 51 receiving the rolls 17. The cage 50 is provided at its forward end with a bearing flange 53 by which the cage is rotatably journaled on the driven member 16 of the overrunning clutch. A pair of cylindrical bushing rings 56 and 57 is positioned between cage 50 and the cylindrical opening 46 in the clutch driving member 15, these rings serving as journal means by which the clutch parts just mentioned are supported in operative relationship. The forward bushing ring 56 is non-rotatably secured to the clutch driving member 15 by means of a pin 59 held in gear 15 by a screw 60 while the bushing ring 57 is allowed to float in order to facilitate assembly. Opposite the pin 59 the bushing 56 is provided with an opening through which extends a spring pressed ball structure 62 including a hardened ball 63, a spring 64 and an adjusting screw 65. Preferably, three of such spring pressed ball structures are provided and they are equally spaced about bushing 56 and serve to apply friction to the cage 50, tending to cause the cage to turn with the clutch driving gear 15.

Referring more particularly to Figure 2, it will be seen that the driven clutch member 16 is provided with a plurality of cam surfaces in the nature of shallow depressions or notches 66, the walls of which are formed to be upwardly inclined in opposite directions with respect to the circumferential or peripheral surface of the member 16. The member 16 may therefore be termed a cam member. The clutch members 15 and 16, and the driving elements 17 are so dimensioned that when the elements 17 are in the bottom of the depressions 66, just sufficient clearance is provided for the driving member 15 to rotate freely with respect to driven member 16. Any relative rotation, however, between the members 15 and 16 tends to cause the rolls to roll toward one end or the other of the depressions 66, riding upon the inclined walls thereof and thus approaching the inner or clutching surface of the opening or chamber 46 formed in driving gear 15. Member 15 therefore serves as a cam member to force the clutching elements 17 outwardly to effect clutching or driving engagement between members 15 and 16. The function, therefore, of the three spring pressed friction elements 63, in tending to cause the cage 50, and hence rolls 17, to rotate with the driving member 15 is to insure immediate and positive movement of the rollers 17 to cause the latter to clutch or lock members 15 and 16 together.

If desired, the clutching surface of the opening or chamber 46 may be provided with grooves or serrations 66, as shown in Figure 3, which serve to roughen the surface and to facilitate locking engagement of the rolls 17 with member 15. For example, where twelve rollers are employed, the number of grooves or serrations may be in the multiple of six for each roller. The depth of these grooves or serrations need be only a very small amount, for example, just sufficient to increase the friction between the driving member 15 and the rollers 17. I have found that serrations of the order of 0.0005 of an inch in depth are satisfactory and will not cause any noise when coasting, due to the presence of the oil film between member 15 and the rollers 17.

Remembering that the driving member 15 of the overrunning clutch device is driven from the motor by gear 12 and that by virtue of the spring pressed balls 63, the cage 50 tends always to rotate with the driving member 15, it will be seen that when the rotation of member 15 is faster than member 16, say to the right in Figure 2, the rollers 17 will be caused to roll up towards the right-hand end of the depressions 66 and thus cause the drive to be transmitted from the driving member 15 to the driven member 16. If now, from any cause whatsoever the driven member 16 is driven at a faster rate of rotation than the member 15, the rollers 17 will be caused to be moved from the right-hand end of the depressions as viewed in Figure 2 toward the left-hand end, this result occurring due not only to the force of friction tending to cause the rollers 17 to rotate with the member 15, but also, and principally, because the balls 63 cause the cage 50 to lag behind member 16 and to rotate with member 15. Thus, the means effective in causing the rollers to engage and lock together the members 15 and 16 when the member 15 is driven forwardly faster than the member 16 is now operative to cause the rollers 17 to roll across the depressions 66 and to positively engage or lock the members 15 and 16 together so that member 15 is driven by the member 16.

As thus arranged and as so far described, the clutch rollers or engaging elements 17, together with the associated structure, is a means for locking the driving and driven members 15 and 16 together to transmit driving torque in both directions, thus acting the same as if members 15 and 16 were keyed together. Under these circumstances, in order to provide an overrunning connection in one direction, it is necessary to prevent the rollers 17 from moving up the inclined surfaces of the depressions 66 in one direction while allowing them to move up the inclined surfaces of the depressions in the cam member 16 in the other direction, thus allowing driving effort to be transmitted thereto in one direction but preventing the driven member 16 from transmitting any driving effort back to the driving member 15 under normal conditions. The means I have provided for this purpose will now be described. Briefly, such means includes structure which is operable at will to prevent the cage 50 from moving in one direction relative to the driven member 15 beyond a point which positions the rollers in the middle or lowest portions of the depressions 66, that is, where the lowest portions of the inclined cam surfaces join. In order, however, to allow normal driving torque to be transmitted to the driven member, the means I have provided includes structure to permit the cage 50 to move relatively to the driven member 16 in the other direction a sufficient amount to permit the rollers to roll up the inclined cam surfaces of the depressions to cause driving or clutching engagement between the members 15 and 16.

Referring now more particularly to Figures 1 and 3, the rear end of cage 50 is provided with a key 70 formed thereon and preferably directly opposite one of the slots 51 in which is positioned one of the clutching elements or rollers 17. As pointed out above, the cage 50 is free to rotate in either direction with respect to the driven member 16 and is frictionally held to rotate with the driving member 15. In order, however, to prevent cage 50 from moving relatively to the driven member 16 in one direction, a control collar or sliding washer 72 is provided and which is slidably but non-rotatably connected with the secondary or intermediate shaft section 11. This connection is preferably accomplished by means of a key 73 fixed to intermediate shaft section 11 and slidably receiving the control washer 72. While I have shown but one such key, it is to be understood that one or more may be provided around shaft 11 if desired. The control collar or washer 72 is provided with a slot 75 somewhat longer than the width of the key 70, as best shown in Figure 3. This is for the purpose of allowing the cage 50 to rotate a limited amount with respect to control collar 72. The arrangement of the collar 72 on driven member 16 is such that when one of the rollers 17 is in the center of one of the depressions 66 in member 16 the key 70 has an edge 77 in substantial alignment with an end 78 of the slot 75 while the other edge of the key is spaced a small amount inwardly of the other end of the slot 75, this being the position shown in Figure 3. As shown in Figure 3, however, the end of the key 70 clears the control washer 72 so that the cage 50, together with the key 70, may rotate with respect to the driven member 16 and the collar 72 secured thereto. If, now, the collar 72 is moved along member 11, and toward the left as viewed in Figure 3, the slot 75 will engage key 70 and thus prevent cage 50 from rotating with respect to the driven member 16, except the limited amount allowed by the key 70 positioned within the slightly longer slot 75. With respect, however, to the cam depressions formed in the driven member 16, the key 70 prevents cage 50 from moving relatively to the driven member 16 past a point where the rollers 17 are in the lowest part of the depressions, this occurring when edge 77 of the key 70 engages end 78 of the slot 75. It is possible, however, for cage 50 to rotate slightly in the other direction with respect to member 16 and the control washer 72 which is sufficient to cause rollers 17 to roll out upon the inclined cam surfaces of the depressions and to cause driving engagement between members 15 and 16 in one direction. Any tendency, however, for the rollers 17 to lock in the other direction is resisted by the limitation of movement of the key 70 on the cage 50 in the slot 75 which, as just stated, prevents the cage 50 from moving in the other direction sufficient to cause locking engagement of the clutch rollers.

Thus, as long as the control washer 72 is in the position shown in Figure 3, that is, disengaged from cage 50, the locking rollers are permitted to lock in either direction. When, however, the control washer 72 is moved to the left in Figure 3, the cage 50 is prevented from moving in one direction relative to the driven member 16 and therefore prevents the rollers 17 from locking in that direction, although permitting locking or driving engagement in the other direction. While I have shown and described only one key 70 and only one slot 75 in operative association therewith, it is to be understood that any number of such keys and slots may be provided as desired, the only requirement being that the slots must be slightly longer than the width of the keys and that the position of the slots and keys must be such that the cage 50 is prevented from rotating in one direction to bring the rollers past the middle of the associated depressions or cam surfaces 66.

Various means may be provided for controlling the collar 72. When the collar is in the position shown in Figure 3, the clutch members 15 and 16 are locked together in both directions, and, when embodied in an automobile transmission, the motor is therefore available for retarding the speed of the car in the usual manner. When collar 72 is shifted to engage the cage to prevent relative rotation thereof in one direction, the driven member 16 of the clutch is capable of overrunning with respect to the driving member 15, that is, the driving clutch member 15 can rotate the driven member 16, but the latter cannot drive the clutch member 15. In this case, when embodied in an automobile construction, the car is able to coast at any normal speed while the speed of the engine may be idling speed, or the engine may be entirely stopped, without exerting any drag or retarding effect on the car.

In Figure 1 I have shown one form of control means for controlling the position of the collar 72. As best shown in that figure, the collar 72 is milled to provide a shoulder 80 thereon, and engaging the shoulder 80 is one end of a pin or link 81 having a notch receiving the shoulder 80 at that end. The pin 81 extends along the secondary shaft 11 in an appropriately formed slot therein and through openings in gear member 18. The other end of the pin 81 is provided with a notch similar to the notch in the first-named end, but slightly longer for a purpose to be later described. This end of the pin 81 extends beyond gear member 18 and is in operative engagement with a shift collar 83 having an outwardly facing peripheral groove 84 formed therein. Collar 83 is preferably provided with some form of flange or shoulder 86 adapted to engage the slot in the end of the pin 81 opposite the collar 72. It will thus be clear that when the shift collar 83 is moved back and forth along secondary shaft 11, the control collar 72 cooperating with cage 50 experiences a corresponding movement which, as is clear in Figure 3, is effective to engage and disengage the cage 50 to respectively prevent or allow the same to rotate with respect to the driven clutch member 16 carried by or forming a part of the secondary shaft 11.

One of the preferred means for shifting the collar 83 takes the form of a pivoted fork 90, best shown in Figure 6 as including a vertical shaft portion 91 journaled in bosses 92 and 93 formed on or secured to housing 1 and arms 96 and 97 preferably integrally secured to shaft portion 91. The arms 96 and 97 are provided with inturned ends 98 and 99 which are received by the groove 84 formed in the collar 83. Pin 102 and spring 103 are provided to locate the collar 83 on shaft 11 after assembling the connecting links 81. As will be obvious from Figure 6, rocking the shaft 91 will cause arms 96 and 97 to move back and forth along shaft 11 by moving collar 83 and, through links 81, the control collar 72.

One means for rocking the shaft 91 journaled in the transmission housing is shown in Figure 5. Here the boss 93 is provided on a bracket 105 secured to or mounted on the cover plate 2 in any desired manner, as by bolts or screws 106. Above the bracket 105 and in alignment with the journal boss 93 the cover plate 2 is provided with a second journal boss 107 adapted to receive the reduced end 108 of an operating finger 110 which is non-rotatably connected through a tongue and groove connection 112 with the upper end of the shaft 91. The operating finger 110 is provided with an arm or extension 114 extending in operative association with a plunger 115 mounted in a suitable bore in the casing 2. The bore is closed by means of an apertured screw threaded cap 117, and between the cap 117 and the plunger 115 a spring 120 is mounted for the purpose of biasing the operating finger 110 to rock the shaft 91 for the purpose of yieldably holding the collar 83 in one of its positions, the plunger having secured thereto a flexible control wire and cable connection 121 such as a Bowden wire. Preferably, the Bowden wire 121 extends to the dash of the automobile or some other location within convenient reach of the operator and may be operated by any lever or plunger structure desired. It may, for example, be controlled by the means shown in Figure 12, to be described hereinafter in detail.

As embodied in Figures 5 and 6, the control means for the collar 83 is biased to normally position collar 83 in its rearward position, that is, the position indicated in dotted lines in Figure 1, which is the position assumed when collar 83 is operated to withdraw control collar 72 from engagement with roller cage 50, thereby rendering the overrunning clutch device inoperative as a means for permitting the driven member thereof to rotate faster than the driving member therefor. When, however, the Bowden wire control member 121 is actuated, either manually or by any other means desired, to move the plunger 115 against the action of the spring 120, the operating finger 110 is rocked in a counterclockwise direction as viewed in Figure 5, thereby rocking the shaft 91 to move collar 83 from its dotted line position shown in Figure 1 to the position shown in that figure in full lines, thereby allowing the spring pressed plungers 123 to resiliently force the control collar 72 into engagement with the cage 50. This operation may, of course, be reversed if desired. In view of the fact that just before the collar 72 is moved to the left in Figures 1 and 3 the cage 50 is rotating with the driving member 15 it may happen that at the instant of contact between the control collar 72 and the key 75 that the key may not be directly opposite the slot 75. For the purpose of allowing control collar 72 to momentarily remain in spaced position relative to the rotating cage 50 until the key 70 reaches slot 75, the notches at the rear ends of the links 81 are made longer than the width of the flange or shoulder 86 on collar 83. This construction, in connection with the yielding spring pressed plungers 123, allows the collar 83 to move to its forward, or lefthand position as illustrated in Figure 1, while still allowing the control collar 72 and links or pins 81 to remain in their disengaged or righthand position. As soon, of course, as the cage 50 is rotated to bring the key 70 opposite the slot 75 the collar 72 will snap into engagement therewith and prevent any further rotation of cage 50 with respect to the driven clutch member 16 in one direction, thereby preventing the rollers 17 from locking in that direction.

Obviously, other means than that just described may be employed for the purpose of shifting the collars 83 and 72, which means may be under the control of the driver, in the case of automobiles, in which case the control would be manual, or such control means may be so arranged as to be automatically operated by some one or more of the usual operating controls, such as the brake operating means or the usual gear shift lever of the automobile. Some of the possible arrangements of control means for the overrunning clutch will be presently described in greater detail in connection with the description of my improved overrunning clutch device as embodied in transmission structures of somewhat different form than that described at length above.

Figure 4:
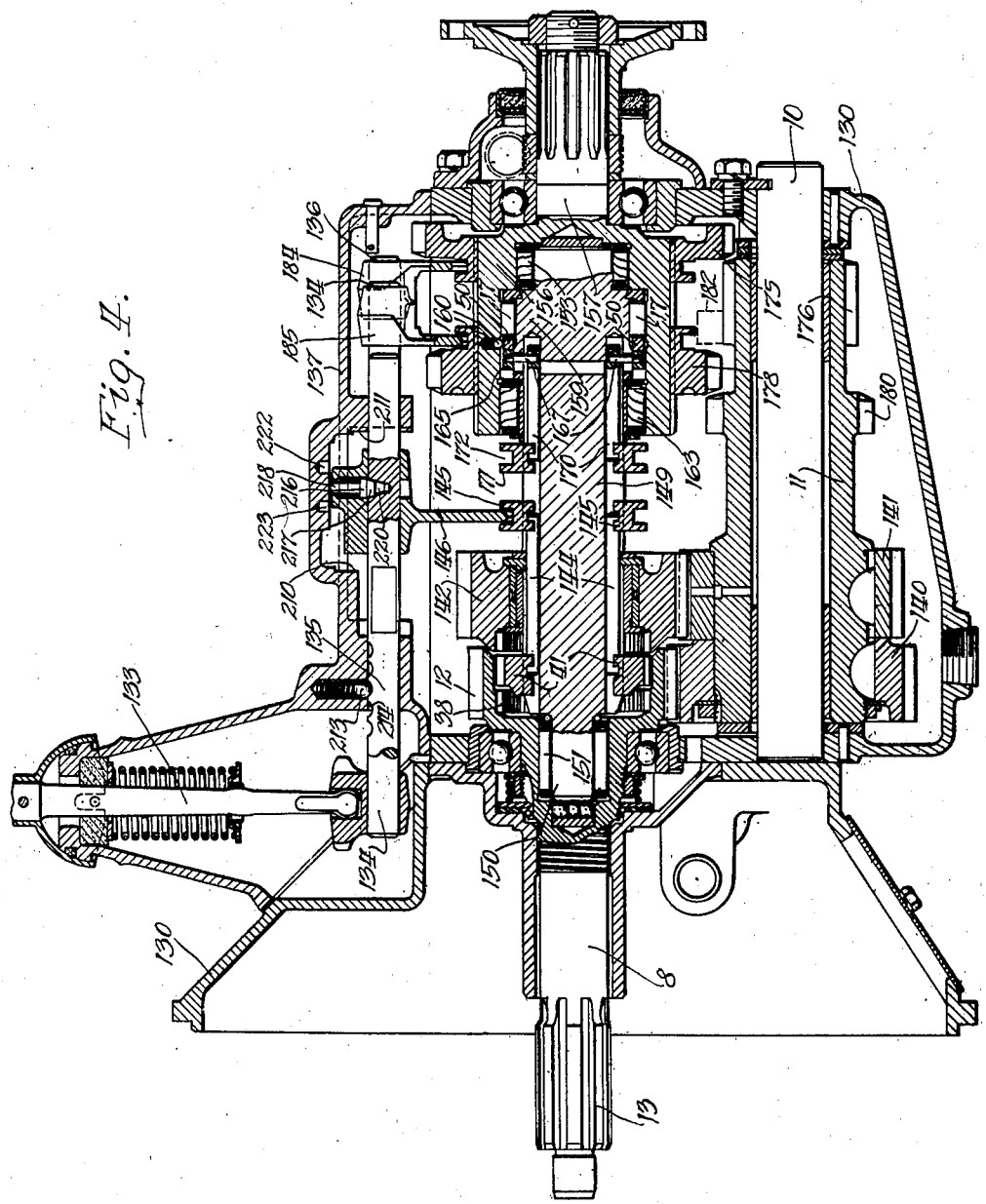
Figure 4 is a vertical longitudinal cross-section taken through a transmission of substantially the same type as that shown in Figure 1 but illustrating the application of the overrunning clutch in a different location in the transmission.

Referring now more particularly to Figure 4, the transmission housing 130 is provided with an operating member in the form of a gear shift lever 133 adapted to control the usual shift rods 134, 135, and 136 mounted in the cover 137 in the usual manner and similar to the structure shown in Figure 1 and described above.

The driving shaft 8 receiving power from the motor is operatively connected to the driving gear 12, as in the modification described above, the driving gear 12 being connected with a driven gear 140 keyed directly to the countershaft section 11 instead of to the overrunning clutch device disclosed in Figure 1. A gear 141 is also keyed to secondary shaft 11 in the same manner as gear 18 in Figure 1, and meshing with gear 141 is a gear 142 identical, for all practical purposes, with gear 22 disclosed in Figure 1. In addition, the sliding dog 41 is provided in this construction and is controlled in a similar manner through connecting pins or links 144 engaged at one end with the sliding dog 41 and at the other end with the shift collar 145, the latter being controlled by a shift fork 146, as is well understood in the art.

The transmission shown in Figure 4 is similar to the conventional transmission in that four speeds forward and one reverse are provided, and the gear 142 is rotatably mounted upon an intermediate shaft section 149 having its forward reduced end 150 carried in a journal bearing 151 in the cylindrical recess formed in driving shaft 8 and gear 12 while the rear end of the intermediate shaft section 149 is journaled, by a roller bearing assembly 153 provided in the cylindrical chamber formed in the enlarged end 156 of the driven shaft 157 which, like the driven shaft 26 shown in Figure 1, is adapted to be directly connected to the usual propeller shaft of the automobile for operating the driving wheels thereof. Between the intermediate shaft section 149 and the driven shaft 157 my improved overrunning clutch structure is provided, and since the clutch structure per se is substantially identical with the overrunning clutch structure described above in connection with the modification shown in Figure 1, I shall not describe all the details thereof as shown in Figure 4. It will suffice, therefore, to note that member 156 is provided with a cylindrical chamber forming on the interior thereof a clutching surface, which may be grooved or serrated as in Figure 3, thus forming the driven member of my overrunning clutch device as embodied in a transmission of the type illustrated in Figure 4. The intermediate shaft section 149 provides at its rearward end the driving member 159 of the overrunning clutch structure and, like member 16 of Figure 1, is provided with cam depressions for cooperation with the driving rolls or clutch elements 17. The elements 17 are mounted in the cage 50 which, like the structure shown in Figure 1, is frictionally engaged by spring pressed balls 160 which thereby tend to cause the cage 50 to rotate with the clutch member 156. A roller bearing assembly 163 engages a bushing or the like on the intermediate shaft 149 and supports the forwardmost cylindrical portion of the enlarged end 156, which serves as a part of the overrunning structure as described above, and the assembly 163 also cooperates with the roller bearing 153 in supporting the rear end of the intermediate shaft section 149 in the driven shaft 157 and in holding the various parts of the overrunning clutch unit in proper position. The control means for the overrunning clutch shown in Figure 4 is similar to the control means described above. In this modification a control collar 165 is provided and is carried in sliding but non-rotatable relationship with respect to the shaft section 149 by means of a plurality of pins 167 secured at one end to the control collar 165 and at their other ends to the connecting links 170 slidable in grooves provided on shaft section 149. The ends of the links 170 opposite the pins 167 have notches to operatively receive the shift collar 171 having a groove 172 therein and which performs the same function as the groove 84 in collar 83 described above.

The control collar 165 is provided with a slot similar to the slot 75 formed in control washer 72 and the cage 50 of Figure 4 has a key cooperating therewith to provide a control for the overrunning clutch which is operable in exactly the same manner as described above. The shift collar 171 is movable longitudinally of the shaft section 149 to engage or disengage the control collar 165 with the clutch cage 50 by means to be described later. While in Figure 4, for purposes of simplicity, I have shown a rigid connection between the shift collar or hub 171 and the links 170, it is to be understood that the latter may be operated by yielding or lost motion means such as that described above in connection with the control collar 83 and the spring pressed plungers or links 123.

The principal distinction between the operation of the construction shown in Figure 4 and that shown in Figure 1 is that in Figure 4 the overrunning clutch is interposed between only third speed and direct speed, whereas in Figure 1 the overrunning clutch device is interposed in all drives except direct. In Figure 4 direct drive is accomplished by sliding the dog 41 forwardly to engage the teeth thereof with the interior teeth 38 formed on driving gear 12, the drive from driving shaft 8 being then transmitted directly to intermediate shaft section 149, through the interposed overrunning clutch structure to the driven shaft 157. Third speed drive is accomplished by sliding the dog 41 rearwardly to engage the teeth thereof with the teeth or splines formed on gear 142. In this case the driving torque from the driving shaft 8 is transmitted from the driving gear 12 down through the gears 140 and 141, and from the latter back to the gear 142 and from thence through sliding dog 41 to the intermediate shaft section 149, and finally through the interposed overrunning clutch to the driven shaft 157.

In this modification, however, low and second speeds and reverse are not driven through an interposed overrunning clutch. Low or first speed is accomplished by sliding the gear 175 forwardly on member 156 to engage the small gear 176 formed on the secondary shaft 11, and second speed is accomplished by sliding gear 178 forwardly to engage the teeth thereof with gear 180 formed on secondary shaft 11 similar to gear 176. Reverse gear is accomplished by sliding the gear 178 rearwardly on member 156 to engage the reverse idler gear 182. In this arrangement, it is noted that the overrunning clutch structure is not employed and that the drive for these speeds is accomplished in the conventional manner.

Gears 175 and 178 are slidable along member 156 by means of the usual shift forks 184 and 185 mounted on shift rods 136 and 134 in the usual manner.

Referring now more particularly to Figures 7 and 8 where I have shown one means for operating the control 171, the operating pins 170 have their forward notched ends engageable with radial inwardly extending lugs 190 formed on control collar 171 and projecting in the slots formed in the intermediate shaft section 149 for the reception of the pins 170. For moving the control collar 171, I provide a construction quite similar to that shown in Figure 6. In Figure 8 the shaft 191 is, however, somewhat shorter than the corresponding shaft 91 of Figure 6 due only to the different positions of the control collars in the transmission housing. The shaft 191 is mounted, however, in a similar manner in journal bosses 192 and 193 and carries operating arms 196 and 197 provided with inturned ends 198 and 199 projecting into the groove 172 on the control collar 171.

The shaft 191 is connected by a tongue and groove connection to an operating member 201 journaled in the journal boss 193 and the oppositely arranged boss 203 and provided with an extending finger 205 resiliently urged in one direction by means of a coil spring 206, one end of which engages the finger 205 while the other end engages the bracket 207 carrying the journal boss 193 in a manner similar to the bracket 105. In this construction, it is obvious that rocking the finger 205 will turn the shaft 191 and cause the arms 196 and 197 to move the control collar 171 back and forth along the intermediate shaft section 149, thereby controlling the operation of the overrunning clutch structure.

In this control means, instead of a Bowden wire connection or some other form of manually operated means, I preferably associate the finger 205 with an operating member on the automobile to automatically render the overrunning clutch device operative or inoperative according to the position of that member. Referring now to Figure 4 it will be noted that the shift fork 146 is carried upon the shift rod 135 and is movable therewith between two limits, namely, when the base of the shift fork 146 contacts with the abutment 210 formed on the cover 137 or with the abutment 211 likewise formed on the cover 137. Associated with the shift rod 135 is the usual spring pressed ball 213 operating in notches 214 formed in the shift rod 135 to define its positions during different gear shifting operations.

When the gear shift rod 135 is moved to bring the base of shift fork 146 against either of the abutments 210 or 211, the slidable dog 41 will have been shifted, either in one direction or the other, the proper distance to engage its teeth with the teeth formed on the gear member 12 or on gear 142. When this is accomplished, the spring pressed ball 213 drops into the notch 214 adjacent the intermediate notch in which the ball 213 is shown in Figure 4.

This intermediate notch just referred to defines the neutral gear position while the adjacent notches define the direct or third speed position, depending on the direction in which the shift rod 135 is moved.

By virtue of means now to be described, the shift rod 135 is made capable of additional movement in either direction from its normal direct speed or third speed position. The shift fork 146 is caused to move with shift rod 135 by virtue of a spring pressed pin 216 having a tapered head 217 and a vertical stem 218. The tapered head 217 extends into a correspondingly formed notch 220 formed in the shift rod 135, the pin 216 being carried as a whole in the base of the shift fork 146. As the shift rod 135 is shifted in one direction or the other to bring sliding dog 41 into engagement with the teeth formed on either the gear 12 or the gear 142, the upper end of the stem 218 merely rides along the upper or inner surface of the cover 137. At the end of this movement, the stem 218 is directly in alignment with bores 222 and 223 formed in said upper surface. At this point, as described above, the base of the shift fork 146 is in contact with one or the other of the abutments 210 or 211.

Upon further continued movement of the shift rod 135 in either direction, the tapered head 216 will be ejected from the tapered opening 220 and will cause the stem to enter one of the bores 222 or 223. At the same time, one of the outermost notches 214 will be engaged by the spring pressed ball 213 and the action of ejecting the pin 216 will necessitate the employment of more power to be used to shift the rod 135, due to the combined resistance of the springs associated, respectively, with the pin 216 and the ball 213.

This additional movement of the gear shift rod 135 is made use of for swinging the vertical shaft 191 to control the operation of the overrunning clutch device. Referring now to Figure 7, it will be noted that gear shift rod 135 is provided with a cam portion 225 having an intermediate slot portion 226 and inclined portions 227. The intermediate portion 226 is of a length such that movement of the shift rod 135 in shifting the sliding dog clutch 41 to either of its shifted positions will not cause movement of the operating finger 205, but when the shift rod 135 is given the additional movement in either direction to eject the pin 216 into one of the bores 222 or 223, one of the inclined cam portions 227 will ride against the operating finger 205 and swing the same, thus swinging the rock shaft 191 and shifting the control collar 165. It is to be noted in this connection that the ejection of the pin or plunger 216 from shift rod 135 into one of the bores 222 or 223 provides a positive lock to hold the gear shift fork 146 in its shifted position until the rod 135 is returned to bring the tapered notch or opening 220 in a position to again receive the head 217 of the pin 216.

The above parts just described are so arranged that when the operating finger is in the position shown in Figure 7, which may be termed the normal position, that is, the position assumed when the gear shift rod 135 is in its neutral position as shown in Figure 4 or when it is shifted in either direction to bring the ball 213 into either one of the adjacent notches 214 and to bring the pin or plunger 216 in alignment with either of the bores 222 or 223, the collar 171 is in its forward position, to the right in Figure 4, to cause the engagement of the control collar 165 with the overrunning clutch cage 50, thereby providing for coasting in direct and third speeds. If it is desired to dispense with the overrunning feature and to utilize the resistance of the motor as a brake, all it is necessary to do is to shift the gear shift lever another step to cause the shift rod 135 to rock the shaft 191 to withdraw the control collar 165 from engagement with the clutch cage 50, thereby establishing a driving connection in both directions between driving member 159 and the driven member 156.

It is to be understood that the above described means for controlling the movement of the control collar 165 is only illustrative of one of many different modes and structures capable of rendering the overrunning clutch operative or inoperative. For example, Figures 9 and 10 illustrate a slightly different structure for utilizing the additional movement of the shift rod 135 for effecting fore and aft shifting of the control collar 165. In this modification, the same type of connection between the shift fork 146 and shift rod 135 as shown in Figure 4 is employed, but the connection between the operating finger 205 and the shift rod is changed in some of its details. In this case the shift rod 135 is provided with a cam 235 similar to the cam 225 shown in Figure 7, except that in Figure 9 the cam 235 is formed on the top of the rod 135 instead of on one side thereof as in the form shown in Figure 7. Like the cam 225, the cam 235 has a generally flat or dwell portion 236 and inclined portions 237. The rear or cam end of shift rod 135 is slidable through an apertured lug 240 carried by the cover 137. Lug 240 is provided with a vertical bore 241 intersecting the aperture receiving shift rod 135. Mounted in bore 241 and having a rounded end in contact with the cam portion of shift rod 135 is a plunger 243 having an upper wedged-shaped end 245 in operative contact with a correspondingly formed wedge-shaped cam 246 formed on a push rod 247 extending laterally of the transmission housing and having an end in contact with or connected to an operating finger similar to the operating finger 205 shown in Figure 7.

Thus, after the shift fork 146 has been moved into contact with either one of the abutments 210 and 211 and the shift lever 133 then given an additional movement to impart a corresponding additional movement to shift rod 135 to bring spring pressed ball 213 into engagement with one of the outermost notches 214, the inclined portion 237 comes into engagement with the lower rounded end of the plunger 243 to project the same upwardly in the bore 241 of the lug projection 240. This upward movement of the plunger 243 causes a transverse movement of the push rod or bar 247, which thereupon swings the operating finger 205 and causes the shaft 191 to move the control collar 165 out of engagement with the overrunning clutch cage 50, thereby causing the driven member 156 and the driving member 159 to be in operative driving engagement in both directions.

An important feature of this modification of clutch control means is that the push rod 247 may be provided with a second wedge-shaped cam 249 in operative association with a second plunger 250 similar in all respects to the plunger 243, but arranged to engage the cam portion 252 of the shift rod 134 directly adjacent the shift rod 135. In this case, the push rod 247 is under the control of not only the shift rod 135, but also the second shift rod 134. This operating means is, therefore, easily adaptable to a transmission such as the one illustrated in Figure 1 or the one shown in Figure 11 and described in detail hereinafter, in which coasting ability is had in first, second and third speeds, and reverse. In such an arrangement, it is desirable to be able to dispense with the coasting feature in any of these speeds. In this case, it is therefore not sufficient to control the overrunning clutch by only one of the shift rods because the shift to first, second and third speeds, and reverse, is possible only through the actuation of more than one shift rod. Therefore in the modification illustrated in Figures 9 and 10, the control means for the overrunning clutch is operatively associated with two of the shift rods and, hence, the additional movement of either one of these shift rods, either forward or rearward, is operative to disengage the control collar from the clutch cage to thereby restore driving connection between the driving and driven members in both directions, thus enabling the motor to be utilized as a brake or retarding force for the collar.

As indicated above, the means I have provided for rendering the overrunning clutch inoperative and for establishing a substantially rigid connection, thereby dispensing with the overrunning feature, is only illustrative of the many different arrangements contemplated by my present invention. For example, any of the usual controls of the automobile may be associated with the control for the overrunning clutch or, if desired, separate and independent control means may be provided therefor.

Referring now more particularly to Figures 11 to 14, inclusive, it will be noted that the transmission and overrunning clutch structure chosen here to illustrate the present invention is quite similar, in general construction, to that shown in Fig. 1. Like Figure 1, this transmission is of the four-speed type and includes a housing 260, a cover plate 261 carrying the gear shift lever 262 and the pedestal 263 therefor, and the shift rods 265, 266 and 267. The forward end of the housing 1 is provided with an elongated journal boss 269 in which the driving shaft 270 is journaled. The rear end of the driving shaft 270 is provided with a driving gear 272 which may be integrally formed with the driving shaft, as shown in Figure 11. The driving gear 272 is recessed to receive the roller bearing structure 273 in which the inner reduced end of the driven shaft 274 is received. The tubular intermediate or countershaft 276 is journaled in the lower part of the housing 260, being carried on a fixed shaft 275 rigidly supported in the housing. The fixed shaft 275 is provided with a flat portion 278 for the reception of a wrench or the like, while the other end is threaded and receives a nut 279 thereon for tightening the fixed shaft in the housing 260.

The secondary or intermediate shaft 276 carries gears 281, 282 and 283, all being keyed or otherwise secured thereto. If desired, some of these gears may be formed integrally with the secondary shaft 276. Gear 283 is preferably a helical gear.

The forwardmost end of the fixed shaft 275 is reduced and carries a bushing 285 thereon, this bushing being clamped between the shoulder 286 on the fixed shaft and the web 287 of the transmission housing when the nut 279 is tightened. The bushing 285 carries a ball bearing structure 290 on which is mounted a driven gear 291. The outer race of the ball bearing 290 is held in gear 291 by means of a snap ring 293 received within the groove 294 formed in the inner surface of the gear 291. The driven gear 291 is in mesh with, and driven by, the driving gear 272 on the driving shaft 270.

An overrunning clutch connection is provided between the driven gear 291 and the tubular secondary or countershaft 276, and this connection will now be described. The driven gear 291 forms the driving element of the overrunning clutch, and for this purpose the driven gear is provided with inwardly extending radial flanges 296 between which there is a groove, indicated by the reference numeral 297. The countershaft 276 is carried on the fixed shaft 275 by means of roller bearings 299 and 300 suitably spaced thereon as by a sleeve 302. The tubular shaft 276 is held in proper position on the fixed shaft 275 by means of a washer 304 threaded onto the forward end of the tubular shaft 276 and having a radial flange 305 extending outwardly and positioned between the outer race of the bearing 290 and one of the flanges 296. The washer 304 is prevented from rotating relative to the tubular shaft 276 by a wire spring ring 307 having an end 308 turned outwardly and projected through an opening in the forwardmost end of the shaft 276 and into engagement with a slot 309 formed in the washer 304, the ring 307 being received within a suitably formed groove in the forward end of the shaft 276. The washer 304 thus cooperates with the driven gear 291 and the bearing 290 therefor to maintain the countershaft 276 in proper position longitudinally of the transmission housing, and the member 304, together with the flanges 296, also serves to maintain the countershaft 276 and the over-running clutch member 291 in their proper position, one relative to the other, so that there will be no binding of the overrunning clutch elements 315.

As in the structure illustrated in Figure 1, an overrunning clutch connection is provided between the gear 291 and the tubular countershaft 276. The groove 297 is formed concentrically in the gear 291, and the forwardmost end of the tubular shaft 276 is received within the gear 291 as described above. Adjacent the groove 297 the forward end of the shaft 276 is formed with a clutching surface 310 which is ground concentric with respect to the axis of the gear 291 and the groove 297. Disposed between these two concentric members are a number of overrunning clutch elements in the form of struts 315 which are formed as illustrated in Figure 15. As there shown, the struts 315 are approximately rectangular members which have two opposite corners rounded or cam-shaped and so dimensioned that the effective cam diameter or distance between parallel tangents is somewhat greater than the space between the clutching surface 310 and the bottom of the groove 297 which forms a cooperating clutching surface. By virtue of this construction, the clutch elements or struts 315 lean in one direction, that is, they are inclined with respect to radii of the concentric clutching surfaces.

The struts are arranged in groups as shown in Figure 15, and each strut of the group is provided with a centrally disposed aperture 316. A spring wire 318 is threaded through the aperture 316. This wire tends to straighten the struts 315 or to cause them to move to a radial position whereby they are held in contact with both clutching surfaces. When the gear 291, which forms the driving element of the overrunning clutch, rotates with respect to the tubular shaft 276, the forward end of which thereby forms the driven element of the overrunning clutch, in the direction of the arrow 320 of Figure 15, the friction of the associated parts causes the struts to wedge between the bottom of the groove 297 and the clutching surface 310, thereby establishing a driving connection between the gear 291 and the tubular shaft 276. The arrow 320 in Figure 15 therefore indicates the direction of rotation of the gear 291 when it is driven by the motor forward of, and connected with, the driving shaft 270. When, however, the relative rotation between the driving and driven elements of the overrunning clutch is in a direction opposite to the arrow 320, the only tendency for the gear 291 to turn the shaft 276 is the friction between the clutching surfaces and the struts 315, which may be neglected. This corresponds to the condition which obtains when the shaft 276 is rotated faster than the gear 291 as when the motor is idling and the car is proceeding at a substantial rate of speed.

Any number of struts 315 may be assembled to form one of the groups mentioned above. In Figure 15 eight are shown as comprising one of the groups, but this number may, of course, be varied within wide limits. In fact, if desired, all of the cam elements or struts necessary to make up the overrunning connection between the parts 276 and 291 may be assembled on one spring wire 315. It is preferable, however, to provide groups of the clutch struts as shown for purposes of assembly and other reasons.

From Figure 11 it will be observed that the rear radial flange 296 formed on the gear 291 is formed concentric with the shaft 276 and in substantial sliding contact with the forward end thereof or the driven member of the overrunning clutch. This particular construction steadies the overrunning clutch and the gear 291.

In an automobile transmission where an overrunning clutch is provided in the drive from the motor to the driving wheels it is desirable and almost essential that some means be provided for locking out or rendering inoperative the overrunning feature, as when it is desired to utilize the motor as a brake. The form of lock-out means provided in the present transmission includes a shifting clutch hub 322 having clutch teeth 323 and a groove 324, as best shown in Figure 11. The end of the gear 291 adjacent the clutch hub 322 is provided with a recess 326 and a plurality of internal teeth 327. The hub 322 may be shifted by any one of the mechanisms described above, such as, for example, the means shown in Figure 6 or Figure 8. I have, however, illustrated in Figure 12 a slightly modified form of control for the shiftable collar or hub which controls the operation of the overrunning clutch. In that figure it will be seen that the slidable clutch hub is splined onto the tubular shaft 276 and has its groove 324 receiving the inwardly extending projections 330 and 331 formed on the arms 332 and 333 of a pivoted shift fork 334. The shift fork or yoke 334 is carried by trunnions 336 and 337 in the transmission housing 260 and has an operating finger 339 projecting laterally into a slot 341 and through the same where it is engaged by a draw rod 343 vertically slidable in an apertured boss 344.

Vertical movement of the draw rod 343 is operable to swing the shift fork or yoke 334 in one direction or the other whereby to move the clutch hub 322 into or out of engagement with the teeth 327 on the gear 291. When the hub 322 is out of engagement, the shaft 276 may overrun the gear 291, but when the clutch hub is in engagement with the gear 291 there is a direct or rigid drive between the gear 291 and the tubular shaft 276. When so engaged, therefore, the overrunning clutch connection is thrown out of operation and the motor may be used as a brake. Figure 12 illustrates one form of manual means for controlling the draw rod 343, and, hence, the operation of the overrunning clutch. The draw rod 343 is provided with a reduced upper end 347 which is provided with an internal bore 348, the upper end of the latter being threaded to receive a bushing 349. The reduced end 347 of the draw rod 343 is encircled by a spring 351 tensioned between a shoulder 352 at the lower end of the draw rod 343 and a cap 353 threaded into the upper end of the apertured boss 344. The spring 351 therefore tends to move the draw rod 343 to its lower position in the apertured boss 344 and, hence, causes the shift yoke 334 to move the clutch hub 322 to its disengaged position as shown in Figure 11.

The draw rod 343 is guided in its vertical movements by a locating screw 355 threaded through the boss 344 and having an end received within a vertical slot 356 formed at the lower end of the draw rod 343 and serving to thereby prevent the rod 343 from rotating in the boss 344, but permitting its vertical movements.

For reasons pointed out above in connection with the overrunning clutch shown in Figures 1 and 4 and somewhat amplified below, it is desirable that the manual control for shifting the draw rod 343 should not be positively connected thereto, but should be connected through some sort of resilient or yielding connection so as to permit the manual means to complete its movement but will allow the clutch hub 322 controlling the action of the overrunning clutch to temporarily remain out of engagement with the gear 291, as arranged for in the overrunning clutch structure of Figures 1 and 4. This is accomplished by mounting within the central bore 348 of the draw rod 343 an operating rod 360 having at its lower end a head 361 providing a shoulder or abutment 362 to receive a spring 364, the upper end of the latter being in contact with the bushing 349 through which the operating rod 360 extends and which is threaded into the upper reduced end of the draw rod 343 as described above. Upward movement of the operating rod 360 is, therefore, operable to compress the spring 362 and, hence, to exert a lifting force upon the draw rod 343 to move the same against the action of the spring 341 and to rock the shift yoke 334. If for any reason the movement of the hub 322 is temporarily delayed, all that occurs is that the spring 364 is compressed an additional amount, thereby allowing the manual member to be moved its normal distance. The spring 364 is under tension and is therefore instantly available without further attention or movement of the manual control member for shifting the hub 322.

In Figure 12 I have shown a manual control member for shifting the operating rod 360. The reference numeral 367 indicates the dash or instrument board or some other part of an automobile which is within convenient access of the operator and a suitably formed apertured bracket 368 is secured in any manner, as by welding or the like, to the instrument board 367. The manual control member proper is indicated by the reference numeral 370 and includes a handle portion 371 having a bored stem 372 receiving one end of an operating plunger 374. The latter is connected with the operating rod 360 through a flexible cable 376 suitably ensheathed in some form of protecting means 377 anchored at its ends to the bracket 368 and the closure 353 by a clamp nut 378 at each end. The cable 376 is preferably soldered to the operating rod 360 and to the operating plunger 374, but any other form of connection between these parts may be utilized.

The bracket 368 carries a pivoted pawl member 380 having a hook 381 at one end and a spring pressed arm 382 at the other end tending to cause the hook end to engage the notch 385 formed on the operating plunger 374. Thus, whenever the operating plunger 374 is moved outwardly, that is, to the right in Figure 12, this movement raises the operating rod 360 and the draw rod 343, thus locking out the overrunning clutch. The hook 381 on the pawl 380 drops into the notch 385 and holds the parts in that position.

In order to release the latched engagement of pawl 380 with the plunger 374, cooperating means is formed on the stem 372 and the pawl lever 380 to raise the hooked end 381 out of the notch 385. The inner end of the stem 372 is formed with a tapered or conical surface 387 and the pawl lever 380 has a cam surface 388 with which the surface 387 cooperates upon relative movement between the stem and the lever 380. To permit this relative movement without disturbing the position of the plunger 374, a lost motion connection is provided between the plunger 374 and the stem 372. This connection is in the form of a pin 390 secured to the plunger 374 and received within slots 391 formed in the stem 372. Thus, whenever the plunger 374 has been drawn outwardly and latched by the pawl lever 380, the manual control 370 may subsequently be given a slight inward displacement, limited by the slotted connection 390—391, to cause the surface 387 to engage the cam 388 and thereby lift the lever 380 out of engagement with the notch 385. The spring 351 then moves the draw rod 343 downwardly and swings the overrunning clutch hub 322 out of engagement with the teeth on the gear 391. In Figure 12 the dotted line position of the control 370 and the associated parts correspond to a condition where the plunger 374 has been pulled out and latched by the pawl 380. The position of these parts in full lines in Figure 12 corresponds to a position which these parts take after the control 370 has been initially moved to release the pawl lever 380 and then the spring 351 has operated to move the draw rod 343 downwardly to disengage the hub 322 from the gear 291. The locating screw 395 threaded into the bracket 368 with its end received within the longitudinal slot 396 permits longitudinal movement of the control 370 but prevents rotation thereof. In this way the notch 385 is always in a position to receive the end 381 of the pawl 380 when the plunger 374 has been pulled outwardly.

Due to the flexible nature of the above described control means for the overrunning clutch, and particularly the resilient operating means for moving the draw rod 343 to shift the overrunning clutch control member, some form of positive stop means should be provided to limit the movement of the finger 339. While these stops may take the form of pins or lugs or the equivalent thereof, I preferably form the draw rod 343 and associated structure so that these parts themselves act as stop means. For one position, the draw rod 343 stops against the bottom of the apertured boss 344, this being the position shown in Figure 12, while for the shifted position stop, the collar or bushing 349 engages with a shoulder 398 formed in the closure 353, thus limiting the movement of the operating rod 360 in an upward direction and thereby acting as a stop for the finger 339.

This flexible control means is an important feature of the present invention. In the transmission of Figure 11, as in the case of Figures 1 and 4, the control hub 322 may be moved toward the gear 291 just at a time when the teeth 323 and 327 would abut so that they would not mesh. By virtue, therefore, of the lost motion yielding connection, the movement of the control member can be completed while yet permitting the teeth 323 and 327 to remain out of engagement. In connection with Figure 13, this feature is made use of to secure a further and important advantage.

It may be extremely desirable to lock out the overrunning cross connection in the transmission at times when the vehicle is traveling at a speed greater than a speed corresponding to the speed of the motor. In such cases, if the control 370 were actuated to shift the control hub 322 forwardly, and if the teeth 323 and 327 were to immediately engage, the gears and the clutch of the automobile might possibly be subjected to considerable shock. It is desirable, therefore, to bring the gear 291 up to a speed corresponding to the speed of the hub 322, which rotates with the countershaft 276, before the teeth of the hub 322 engage with the teeth 327 on the gear 291. I secure this result by providing ratchet faces on the ends of the teeth 323 and 327, these ratchet faces being indicated, respectively, by the reference numerals 400 and 401. The ratchet faces are so inclined that when an attempt is made to bring the hub 322 in engagement with the gear 291 at a time when the hub and the shaft 276 is rotating in the direction of the arrow 403 at a speed greater than the gear 291, the faces 400 and 401 will ratchet and will not permit the teeth on these two members to become engaged until their speeds of rotation are approximately the same. However, by virtue of the yielding connection afforded by the spring 362, the manual control 370 can be fully actuated and the spring will automatically cause the teeth to engage at the proper time.

This important feature of the present invention has also been applied to the shiftable dog or hub which connects the driving shaft 270 with the driven shaft 274 to effect direct drive. As above shown in Figure 11, this slidable hub is indicated in its entirety by the reference numeral 410 and will be seen to comprise a pair of individual clutch hubs 411 and 412 threaded or otherwise secured together. The clutch hub 412 is provided with teeth 414 engageable with teeth 415 formed interiorly of the annular recess in the helical gear 416 loosely journaled by a bushing 417 on the driven shaft 274. The forward clutch hub 411 is also provided with teeth 419 which are engageable with teeth 420 formed within the driving gear 272.

The slidable clutch hub or dog assembly 410 is controlled by means of a shift fork 422 carried in the usual manner upon the shift rod 267 and provided with a forked end embracing the portion of the clutch dog 410 intermediate the individual hubs 410 and 411. A washer 425 and a spring 426 also embrace the intermediate portion of the clutch hub assembly. The shift fork 422 is movable in the usual manner upon actuation of the gear shift lever 262 to move the clutch dog 410 either forwardly or rearwardly according to whether it is desired to operate in direct drive or in an intermediate speed. When the shift fork 422 is moved rearwardly its forked end engages a shoulder 428 on the clutch hub 412 and moves the latter into engagement with the teeth on the gear 416. When the shift fork 422 is moved forwardly it bears against the washer 425 which in turn bears against the clutch hub 411 and thereby resiliently presses the teeth 419 into engagement with the teeth 420 formed on the driving gear 272.

Like the overrunning clutch lockout structure described above, it sometimes occurs that when it is desired to engage the driving and the driven shafts by moving the clutch hub 410 forwardly, the latter is rotating at a speed which may be considerably in excess of the speed of the driving gear 272. In order to prevent the sudden engagement of the teeth 419 with the teeth 420 when they are rotating at different speeds and to provide for a condition where the teeth 419 and 420 momentarily abut, I form these teeth with ratchet faces 429 and 430 respectively, the angle of the ratchet faces being such that the teeth 419 will not engage with the teeth 420 as long as the former are rotating at a substantial speed. By virtue, however, of the yieldable spring 426, the fact that the teeth 419 do not immediately engage with the teeth 420, from whatever reason, will not prevent the shift fork 422 from being moved to its customary position corresponding to direct drive. In case the teeth do not immediately engage, the spring 426 is compressed and is therefore instantly available to automatically cause the engagement of these teeth just as soon as the speeds of the gear 272 and the clutch hub 411 are approximately the same and the teeth 419 and 420 are in position to mesh. The clutch hub or dog 410 is splined onto the driven shaft 274 in the usual manner.

Figure 16 illustrates another structural embodiment of the principles of the present invention, and it will be noted that the transmission shown in Figure 16 is similar in many respects, particularly as to the general arrangement, to the transmission shown in Figure 4. In Figure 16, however, it is the purpose to provide a four-speed transmission with a coaster device so constructed and arranged that coasting is had in second, third and high or direct speeds only, the low speed and reverse being provided for in the conventional manner. For purposes of clarity, the upper part of the transmission including the shifter rods has been omitted in order that the other parts may be shown at a somewhat larger scale.

In Figure 16, the forward portion of the housing 450 is provided with a forwardly extending hub 451 in which is mounted the driving shaft 452 having formed thereon or secured thereto a driving gear 453 substantially identical for all practical purposes with the driving gear 12 shown in Figure 4. The driving gear 453 has clutch teeth 454 and an interior bore 457 in which is arranged bearing means 458 carrying the inner or forward reduced end 459 of an intermediate shaft 460 which is splined as shown in Figure 16.

Bearing means 462 capable of taking both axial and radial thrusts is carried at the forward end of the housing 450 and supports the driving gear 453 and the rear end of the driving shaft 452, together with the reduced end 459 of the intermediate shaft 460.

Bearing means 464 similar to the bearing means 462 is provided at the rear of the transmission housing 450. This bearing means carries the driven shaft 465 having at its forward end an enlarged splined cylindrical member or portion 466 formed integrally with the driven shaft 465, or it may be separately formed and secured in any manner to the driven shaft. The rear end of the intermediate shaft 460 is reduced as at 467 and is carried by roller bearings 469 in an interior bore in the driven shaft 465 and the member 466. A thrust washer or bearing 470 lies between the rear end of the intermediate shaft 460 and the bottom of the interior bore in the driven shaft 465. Thus, any rearward thrusts on the intermediate shaft 460 are taken by the bearings 470 and 464.

A tubular lay or countershaft 471 is mounted in the lower part of the transmission housing 450 and is carried upon a fixed shaft 472. The forward end of the fixed shaft 472 is threaded and receives a nut 475 which, when tightened, securely holds the fixed shaft 472 in place.

Between the intermediate shaft 460 and the final or driven shaft 465 an overrunning clutch connection is provided which is of the same design as that illustrated in Figures 11 and 15 and which therefore need not be described in detail. It suffices to note that the overrunning clutch elements 477 are carried in groups upon a spring wire connection 478 and are adapted to wedge between one clutching surface 480 formed by an interior groove in the portion 466 of the driven shaft 465 and a second clutching surface 481 provided by a cylindrical portion 482 formed adjacent the reduced end 467 of the intermediate shaft 460. The cylindrical portion 482 therefore forms the driving element of the overrunning clutch while the portion 466 of the driven shaft 465 forms the driven element of the overrunning clutch, and the portions of the member 466 on opposite sides of the groove or surface 480 serve as flanges, similar to the flanges 296 (Figure 11) described above, and bearing means 483 cooperate with one of the flange portions to maintain the clutch surfaces 480 and 481 in proper relation. The overrunning clutch elements 477 are arranged in the manner illustrated in Figure 15 from which it will be seen that driving torque will be transmitted from the intermediate shaft 460 to the clutch elements 477 and to the driven shaft 465, but due to the inclination of the clutch elements 477 the driven shaft 465 may overrun the intermediate shaft 460 thereby allowing the car or other vehicle to coast. The overrunning clutch parts are steadied and held in concentric relation by the bearings 464 and 469 and by the bearing rolls 483 positioned between portions forming races on the intermediate shaft 460 and the driven shaft 465.

The overrunning clutch may be rendered inoperative by means of a sliding clutch hub 484 splined onto the intermediate shaft 460 and rotatable therewith. The hub 484 carries teeth 485 which are constructed and arranged to engage with teeth 486 formed near the forward edge of the portion 466 of the driven shaft 465. These teeth are provided with ratchet faces, indicated by the reference numerals 487 and 488, which are substantially identical for all practical purposes with the ratchet face construction illustrated in Figures 13 and 14. The operation of the ratchet face construction shown in Figure 16 is the same as that shown in Figures 13 and 14.

The sliding clutch hub 484 is provided with a shift groove 490 which is adapted to receive the arms of a shift fork pivoted in the housing 450. The construction illustrated in Figure 12 is particularly adapted for controlling the operation of the hub 484 and, hence, the operation of the overrunning clutch. It is to be understood, however, that the sliding hub or collar 484 may also be under the control of such mechanisms as are illustrated in Figures 5 to 10. Preferably, such mechanism or control means should include some form of yielding or lost motion connection as described above.

The tubular countershaft 471 has gear teeth 492 and 493 milled or machined thereon, and the forward end of the shaft 471 carries gears 494, 495 and 496 suitably keyed or otherwise secured thereto. From Figure 16 it will be observed that the forwardmost gear 496 extends forwardly of the secondary or countershaft 471 and is provided with a recess receiving one race 497 of a bearing structure, the inner race 498 of which is secured to the housing 450 and to the fixed shaft 472. The inner race 498 is clamped in place by virtue of the cylindrical bushing 499 having a radial flange 500 abutting against the race 499 against a shoulder 501 formed on the fixed shaft 472 and facing forwardly. The forward edge of the race 499 is adapted to abut against the forward web or wall of the transmission housing 450 so that when the nut 475 is tightened the bearing structure and the fixed shaft are securely held in position. The gear 496 is in constant mesh with the driving gear 453 and therefore the tubular countershaft 471 is driven at all times. The rear end of the countershaft 471 is carried by roller bearings 503.

A gear 510 is rotatably journaled on the intermediate shaft 460 by a bushing 511 practically identical with the bushing 417 shown in Figure 11. This bushing is splined onto the forward splined portion of the intermediate shaft 460 and is locked in place by a toothed ring or washer 512. The latter is held in place by a spring pressed plunger 513. A series of clutch teeth 520 are machined on the floating gear 510 and these teeth are adapted to be engaged with teeth 521 formed at the rear end of a sliding clutch dog 522 mounted on and rotatable with the intermediate shaft 460. The forward end of the clutch dog 522 carries clutch teeth 524 which are formed to engage with the teeth 455 on the driving gear 453. The clutch dog or hub 522 has a shifter groove 526 adapted to be engaged by arms of a shifter fork of the usual type carried by a shift rod (not shown) in the customary manner. If desired, the teeth 455 and 524, and the teeth 520 and 521 may have ratchet faces like those shown in Figures 13 and 14. The floating gear 510 is in constant mesh with the gear 495 on the countershaft 471 and these gears preferably have helical teeth.

The gear 530 is slidable on the splines at the rear end of the intermediate shaft 460 and this gear 530 is adapted to be moved into and out of engagement with the gear 494 on the countershaft 471. The position of the slidable gear 530 is controlled by a shift fork of the usual type received within the circumferential shifter groove 531 formed in the hub of the gear 530.

The portion 466 of the driven shaft 465 is splined, as indicated above, and this splined portion carries a gear 535 slidable thereon and rotatable with the driven shaft 465. This gear carries the usual shifter groove 536 by which the position of the gear 535 is controlled. The gear 535 meshes with the gear 492 or with a reverse idler gear 540 shown in dotted lines in Figure 16. The reverse idler gear 540 is in driving engagement with the gear teeth 493 on the countershaft 471.

The operation of this transmission is substantially as follows: High speed or direct drive is effected by sliding the clutch dog 522 forwardly on the forward splines of the intermediate shaft 460 so as to engage the teeth 524 with the teeth 455 on the driving gear 453. The drive from the driving shaft 452 is transmitted directly to the intermediate shaft 460 and from there through the overrunning clutch structure to the final or driven shaft 465. Third speed is effected by sliding the clutch dog 522 rearwardly to engage the teeth 521 with the teeth 520 on the floating gear 510 whereby the latter is then locked to the intermediate shaft 460. The drive from the driving shaft is then transmitted through the driving gear 453 to the gear 496 and the countershaft 471 and from there through the gear 495 to the gear 510 which then drives the intermediate shaft 460 and the final driven shaft 465 through the overrunning clutch connection. Second speed is obtained by sliding gear 530 forwardly until its teeth engage with the teeth of the gear 494 on the countershaft 471. Like the preceding selections, the drive in second speed is through the overrunning clutch. For low speed the gear 535 is shifted rearwardly on the splined portion 466 of the final driven shaft until the teeth of the gear 535 engage with the teeth 492 at the rear end of the countershaft 471. The countershaft being continuously driven the drive in low speed is through the gear 535 directly to the driven shaft 465 and it does not go through the overrunning clutch connection. In a similar manner, reverse drive is effected by moving the gear 535 forwardly until it engages with the idler reverse gear 540. In this speed also the drive is transmitted directly to the driven shaft 465 without going through the overrunning clutch connection. In this transmission, therefore, coasting is had in second, third and high or direct speeds while the overrunning means is not arranged to provide for coasting in low speed and in reverse. It is to be understood, of course, that, like the preceding transmissions, the overrunning clutch connection may be locked out or rendered inoperative at any time by merely latching the driven overrunning clutch member with the driving member thereof.

While I have shown and described the preferred structural embodiment of the present invention, it is to be understood that my invention is not to be limited to the structure shown and described, but that, in fact, widely different means may be employed in the practice of the broader aspects of my invention.

What I claim, therefore, and desire to secure by Letters Patent is:—

1. In a transmission, a housing, driving and driven shafts journaled therein, an intermediate shaft mounted for rotation in the housing, connections between said intermediate shaft and the driving shaft, connections between the intermediate shaft and the driven shaft, one of said connections including meshing helical gears and an over-running clutch having a cylindrical member with means serving as axially spaced inwardly extending radial flanges embracing a portion of said intermediate shaft, one of said gears being carried by said cylindrical member, over-running clutch elements of the friction type disposed between said flanges and cooperating with said portion of the intermediate shaft, and means on the intermediate shaft and cooperating with at least one of said flanges for maintaining against the thrust of said meshing gears the proper relation between said member and the intermediate shaft relative to said clutch elements.

2. In a transmission, a housing, driving and driven shafts journaled therein, a fixed shaft secured in said housing, a tubular secondary shaft journaled in said housing for rotation on said fixed shaft, a driving connection between the driving shaft and said secondary shaft consisting of meshing gears and an over-running clutch having a cylindrical member connected with one of said gears and embracing one end of said secondary shaft and over-running clutch elements disposed between said cylindrical member and said one end of the secondary shaft, bearing means supporting said cylindrical clutch member on said fixed shaft in accurate concentricity with respect to said tubular secondary shaft against the thrust of said meshing gears, means for supporting said bearing means comprising a bushing, means forming a shoulder on said fixed shaft and means for clamping said bushing between the shoulder on said fixed shaft and one wall of said housing, and cooperating means on said cylindrical clutch member and said tubular secondary shaft for maintaining these parts in proper position against axial thrust of said meshing gears.

3. In a transmission, a housing, driving and driven shafts journaled therein, a fixed shaft carried within said housing, a tubular lay shaft journaled for rotation on said fixed shaft, bearing means supporting the tubular lay shaft on said fixed shaft, means forming a clutching surface on one end of the tubular lay shaft and a shoulder disposed adjacent said surface, a pair of gears connecting the driving shaft with said tubular lay shaft, one of said gears including a cylindrical section embracing said clutching surface and having a radially inwardly extending flange adapted to abut against said shoulder on the lay shaft, over-running clutch elements disposed between said cylindrical section of the gear and said clutching surface, and bearing means separate from the bearing means for the tubular lay shaft for supporting said gear on said fixed shaft.

4. In a transmission, a housing, driving and driven shafts journaled therein, a fixed shaft secured in said housing, a tubular secondary shaft journaled in said housing for rotation on said fixed shaft, a driving connection between the driving shaft and said secondary shaft consisting of meshing gears and an overrunning clutch having a cylindrical member with supporting bearing means therefor carried by said fixed shaft and disposed in the plane of one of said gears, said cylindrical member including portions embracing one end of said secondary shaft and overrunning clutch elements disposed between said cylindrical member and said one end of the secondary shaft, and bearing means disposed adjacent the plane of said overrunning clutch elements for supporting said end of the secondary shaft on said fixed shaft.

5. In a transmission, a housing, driving and driven shafts journaled therein, a fixed shaft carried within said housing, a tubular lay shaft journaled for rotation on said fixed shaft, bearing means supporting the tubular lay shaft on said fixed shaft, means forming a clutching surface on one end of the tubular lay shaft and a shoulder disposed adjacent said surface, a pair of gears connecting the driving shaft with said tubular lay shaft, one of said gears including a cylindrical section embracing said clutching surface and having a radially inwardly extending flange adapted to abut against said shoulder on the lay shaft, overrunning clutch elements disposed between said cylindrical section of the gear and said clutching surface, and bearing means separate from the bearing means for the tubular lay shaft for supporting said gear.

6. In a transmission, a housing, driving and driven shafts journaled therein, a fixed shaft carried within said housing, a tubular lay shaft journaled for rotation on said fixed shaft, bearing means supporting the tubular lay shaft on said fixed shaft, an overrunning clutch member embracing one end of said lay shaft and having gear connection with said driving shaft, means forming a clutching surface on one end of the tubular lay shaft and a shoulder disposed adjacent said surface, overrunning clutch elements disposed between the clutching surface on said lay shaft and said clutch member, a flange disposed on said overrunning clutch member against said shoulder, cooperating means carried by said lay shaft and said clutch member for holding the latter up against said shoulder, and bearing means supporting said overrunning clutch member on said fixed shaft.

7. In a transmission, a housing, driving and driven shafts journaled therein, a fixed shaft carried within said housing, a tubular lay shaft journaled for rotation on said fixed shaft, bearing means supporting the tubular lay shaft on said fixed shaft, a pair of gears connecting the driving shaft with said tubular lay shaft, one of said gears including a cylindrical section embracing one end of said tubular lay shaft, overrunning clutch elements disposed between said cylindrical section of the gear and said end of the lay shaft, and a member mounted on said end of the lay shaft for maintaining the latter and said one gear in proper axial position.

8. In a transmission, a housing, driving and driven shafts journaled therein, a fixed shaft carried within said housing, a tubular lay shaft journaled for rotation on said fixed shaft, bearing means supporting the tubular lay shaft on said fixed shaft, a pair of gears connecting the driving shaft with said tubular lay shaft, one of said gears including a cylindrical section embracing one end of said tubular lay shaft, overrunning clutch elements disposed between said cylindrical section of the gear and said end of the lay shaft, a member mounted on said end of the lay shaft for maintaining the latter and said one gear in proper axial position, and bearing means separate from the bearing means for the tubular lay shaft and disposed adjacent said member for supporting said one gear for rotation wth respect to said lay shaft.

9. In a transmission, a housing, driving and driven shafts journaled therein, a fixed shaft carried within said housing, a tubular lay shaft journaled for rotation on said fixed shaft, bearing means supporting the tubular lay shaft on said fixed shaft, a pair of gears connecting the driving shaft with said tubular lay shaft, one of said gears including a cylindrical section embracing one end of said tubular lay shaft, overrunning clutch elements disposed between said cylindrical
5 section of the gear and said end of the lay shaft, a member mounted on said end of the lay shaft for maintaining the latter and said one gear in proper axial position, bearing means separate from the bearing means for the tubular lay shaft and disposed adjacent said member for supporting said one gear for rotation with respect to said lay shaft, and means supporting said separate bearing means directly on said transmission housing.

ROBERT LAPSLEY.